United States Patent
Pramod et al.

(10) Patent No.: US 11,218,099 B2
(45) Date of Patent: Jan. 4, 2022

(54) SUPPLY CURRENT MANAGEMENT UNDER VOLTAGE SATURATED MOTOR CURRENT CONTROL

(71) Applicant: STEERING SOLUTIONS IP HOLDING CORPORATION, Saginaw, MI (US)

(72) Inventors: Prerit Pramod, Bay City, MI (US); Zhe Zhang, Saginaw, MI (US); Krishna MPK Namburi, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 14 days.

(21) Appl. No.: 16/695,910

(22) Filed: Nov. 26, 2019

(65) Prior Publication Data

US 2021/0159827 A1 May 27, 2021

(51) Int. Cl.
*H02P 21/00* (2016.01)
*H02P 29/02* (2016.01)

(52) U.S. Cl.
CPC .......... *H02P 21/0089* (2013.01); *H02P 29/02* (2013.01)

(58) Field of Classification Search
CPC .. H02P 3/18; H02P 21/13; H02P 21/24; H02P 23/00; H02P 27/06; B62D 5/46; B62D 6/10; G01L 3/26
See application file for complete search history.

(56) References Cited

U.S. PATENT DOCUMENTS

| | | | |
|---|---|---|---|
| 6,841,969 B1* | 1/2005 | Schulz | H02P 21/13 318/610 |
| 2004/0007997 A1* | 1/2004 | Fu | H02P 21/06 318/432 |
| 2006/0055363 A1* | 3/2006 | Patel | H02P 21/0089 318/757 |
| 2011/0309781 A1* | 12/2011 | Tomigashi | H02P 21/13 318/504 |
| 2016/0373043 A1* | 12/2016 | Yamazaki | H02P 21/22 |
| 2019/0363653 A1* | 11/2019 | Mok | H02P 6/08 |

* cited by examiner

*Primary Examiner* — Said Bouziane
(74) *Attorney, Agent, or Firm* — Dickinson Wright PLLC

(57) ABSTRACT

A system and method for improved anti-windup that minimizes supply current draw under voltage saturated current control operation of synchronous motor drives are provided. The system and method use a voltage limiting module configured to receive a pre-limit voltage command and generate a post-limit voltage command when the motor control system reaches configured threshold; and an anti-windup module configured to determine a voltage difference between the post-limit and pre-limit voltage commands, and compute an anti-windup feedback current using the voltage difference and compensation gains selected to minimize supply current. The compensation gains comprise a gain matrix of values selected to move a motor current trajectory toward a null motor current vector, and the anti-windup module multiplies the gain matrix values by the voltage difference. The anti-windup feedback current and an input current command are then added and provided as an input to the controller.

15 Claims, 6 Drawing Sheets

SUPPLY CURRENT MANAGEMENT UNDER VOLTAGE SATURATED MOTOR CURRENT CONTROL

BACKGROUND

The present application generally relates to motor control systems, and particularly to managing supply current in motor control systems under voltage saturated conditions, and more particularly to motor control systems used in electric machines like electric power steering (EPS) systems.

EPS systems typically use an electric motor drive to provide steering assist torque to a driver. Typically, torque control of an electric motor drive system that uses a permanent magnet synchronous machine (PMSM) is performed indirectly by regulating the motor current. In general, the current control of machine currents is performed using a feedback control architecture with measured currents in the synchronously rotating reference frame utilizing the field oriented control (FOC) technique. Feedback control typically exhibits good steady-state tracking performance, fast dynamic response, high bandwidth and satisfactory disturbance rejection. As a result, feedback current control is commonly used to control multi-phase AC machines such as PMSMs.

SUMMARY

A motor control system for preventing controller windup and managing supply current under voltage saturation conditions is provided in accordance with one or more illustrative embodiments. The motor control system comprises a voltage limiting module configured to receive a pre-limit voltage command and generate a post-limit voltage command when the motor control system reaches a selected voltage limit corresponding to a configured threshold for limiting voltage applied to a motor controlled by the motor control system; and an anti-windup module configured to determine a voltage difference by subtracting the post-limit voltage command from the pre-limit voltage command, and to compute an anti-windup feedback current using the voltage difference and compensation gains selected to minimize supply current.

A method for preventing controller windup and managing supply current under voltage saturation conditions in an electric motor is also provided in accordance with one or more illustrative embodiments. For example, the method includes receiving, by voltage limiting module in a motor control system, a pre-limit voltage command and generating a post-limit voltage command when the motor control system reaches a selected voltage limit corresponding to a configured threshold for limiting voltage applied to a motor controlled by the motor control system; and determining, by an anti-windup module in the motor control system, a voltage difference by subtracting the post-limit voltage command from the pre-limit voltage command, and computing an anti-windup feedback current using the voltage difference and compensation gains selected to minimize supply current.

In accordance with other illustrative aspects of the system and method, the compensation gains comprise a gain matrix of values selected to move a motor current trajectory of the motor toward a null motor current vector, and the anti-windup module multiplies the gain matrix values by the voltage difference.

In accordance with another illustrative aspect of the system and method, the anti-windup module computes the anti-windup feedback current using a calculation comprising scaling the difference using a gain matrix $$K_{AW} = \begin{bmatrix} K_{Add} & K_{Adq} \\ K_{Aqd} & K_{Aqq} \end{bmatrix},$$

where $K_{Add}$, $K_{Adq}$, $K_{Aqd}$, and $K_{Aqq}$ are anti-windup parameters.

In accordance with another illustrative aspect of the system and method, the anti-windup feedback current is provided as feedback to an input current command to the motor control system to introduce feedback cross-coupling of the voltage difference to the current error.

In accordance with another illustrative aspect of the system and method, the anti-windup feedback current and an input current command are added and provided as an input to an integral controller to generate a voltage command.

In accordance with another illustrative aspect of the system and method, the input current command is further modified by adding a second feedback current based on a measured current of the electric motor.

In accordance with an illustrative aspect of the system and method, the pre-limit voltage command is computed based on a back-EMF compensation and a feedback based on a measured current of the electric motor.

An example steering system is provided that has an electric motor that generates an amount of torque corresponding to a post-limit voltage command; and a controller that receives an input current command and generates a voltage command for the motor. The controller comprises a voltage limiting module configured to receive a voltage command corresponding to a pre-limit voltage command and generate post-limit voltage command when the motor control system reaches a selected voltage limit corresponding to a configured threshold for limiting voltage applied to the motor; and an anti-windup module configured to determine a voltage difference by subtracting the post-limit voltage command from the pre-limit voltage command, and to compute an anti-windup feedback current using the voltage difference and compensation gains selected to minimize supply current. The anti-windup feedback current modifies the input current command to the controller to prevent controller windup in a motor control system and to minimize supply current draw under voltage saturated current control.

In accordance with illustrative aspect of the steering system, the anti-windup feedback current is calculated by scaling the difference between the post-limit voltage command and the pre-limit voltage command. For example, the difference is scaled using a gain matrix $$K_{AW} = \begin{bmatrix} K_{Add} & K_{Adq} \\ K_{Aqd} & K_{Aqq} \end{bmatrix},$$

where $K_{Add}$, $K_{Adq}$, $K_{Aqd}$ and $K_{Aqq}$ are anti-windup parameters.

In accordance with anther illustrative aspect of the steering system, the input current command is further modified by a second feedback current based on a measured current of the electric motor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
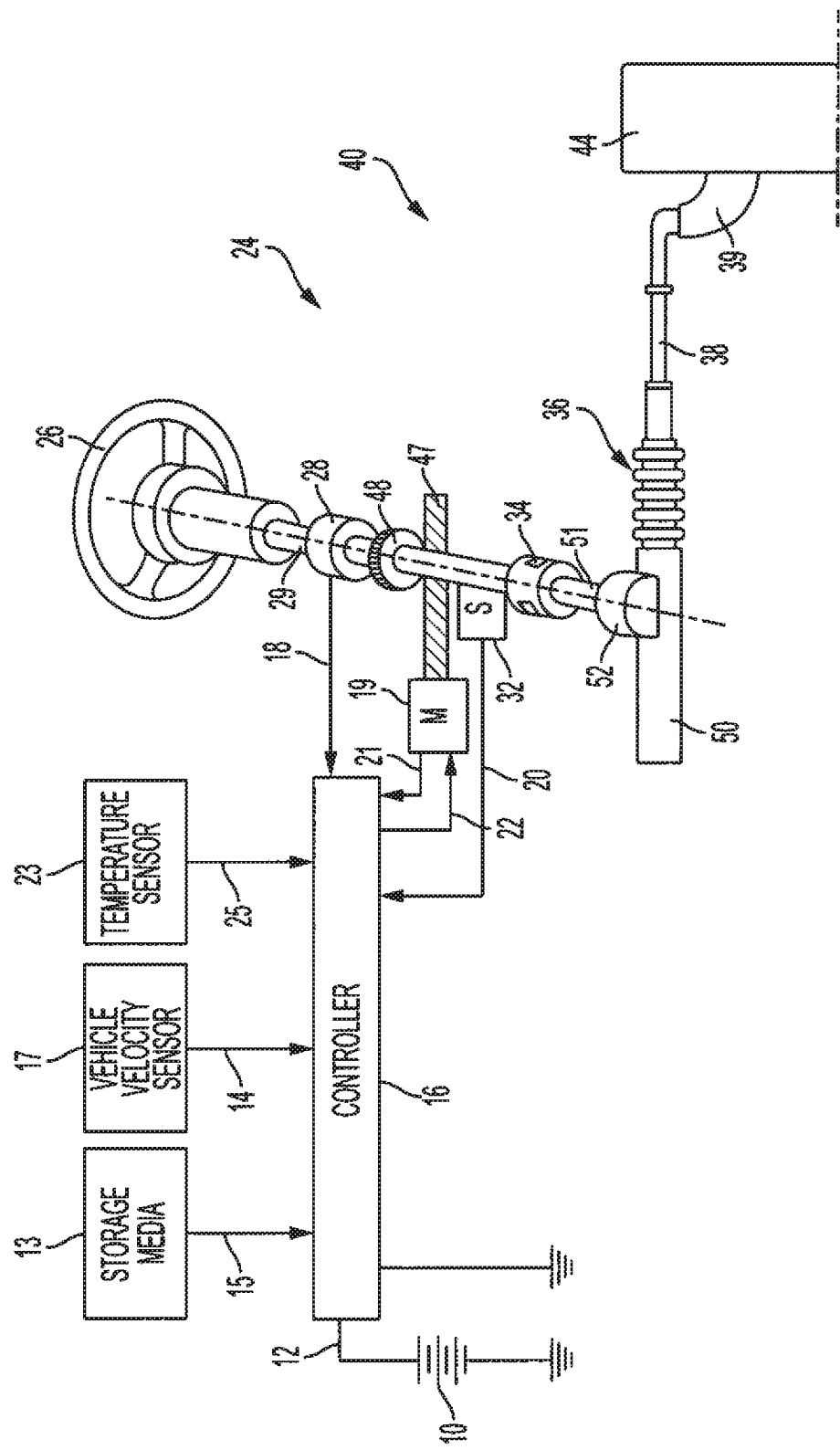
FIG. 1 depicts an example electric power steering system according to one or more illustrative embodiments.

Referring now to the Figures, where the technical solutions will be described with reference to specific embodiments, without limiting same, FIG. 1 is an illustrative embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor (PMSM), and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity om may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., valve control, fluid pumps, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the control system 24 operates in a feedback control mode, as a current regulator, to generate the command 22. Alternatively, in one or more examples, the control system 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more illustrative embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 is located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

Figure 2:
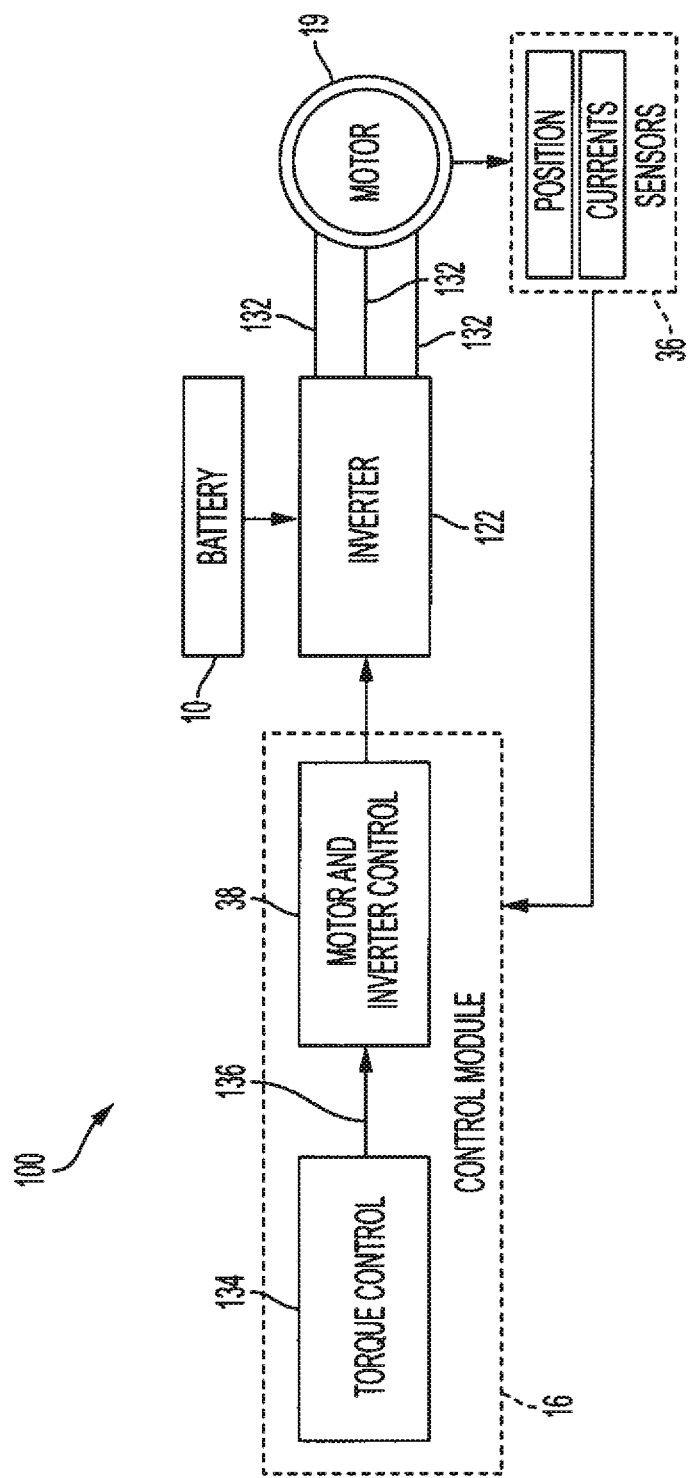
FIG. 2 is an example schematic illustration of a motor control system in accordance with illustrative embodiments.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein, FIG. 2 depicts a block diagram of a motor control system according to one or more embodiments. The motor control system 100 may be part of the steering system 40, or any other machine that uses a motor to cause displacement, generation of torque, and the like. As depicted, the voltage supply 10 provides a supply voltage $V_B$ to the motor 19. In some embodiments, the voltage supply 10 is a 12-volt battery. However, it is to be understood that other types of voltage supplies may be used as well. In one or more examples, the inverter 122 is connected to the motor 19 by multiple connections 132 (e.g., three connectors). In some embodiments, the motor 19 is a poly-phase, permanent magnet synchronous motor (PMSM). In the examples described herein, the motor 19 is considered a three-phase PMSM, however it should be noted that in other examples, the motor 19 may be a poly-phase motor. The controller 16 is connected to the motor 19 through the inverter.

The controller 16 receives a motor torque command 136 from a torque control system 134 such as, for example, a steering control system. The controller 16 includes control logic 134 and 38 for sending a motor voltage command based on the torque command to the motor 19 through the inverter 122.

Figure 3:
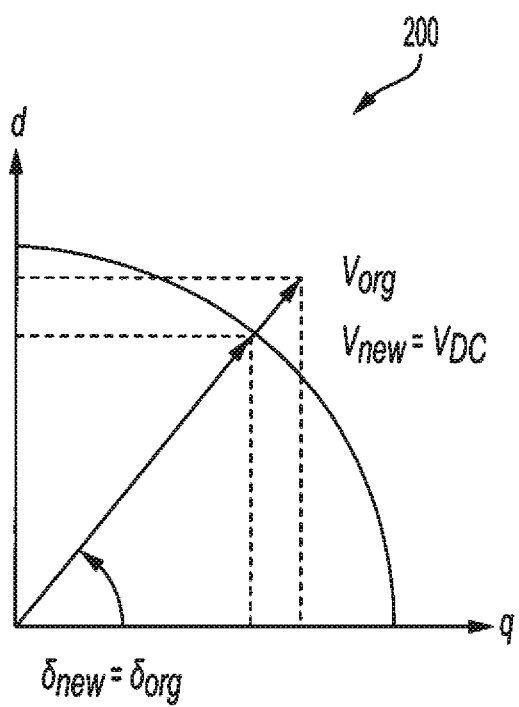
FIG. 3 is a phasor diagram of a motor in accordance with illustrative embodiments.

FIG. 3 with continuing reference to FIG. 2, represents a phasor diagram 200 of a motor control system, in which the commanded voltage is limited by a direction-preserving voltage limiter according to one or more embodiments. In FIG. 3, a voltage magnitude of the direct axis (d-axis) is represented on the vertical axis, whereas a voltage magnitude of the quadrature axis (q-axis) is represented on the horizontal axis. The motor 19 shown in FIG. 1 and FIG. 2 may operate such that a magnitude of a motor voltage command $V_R$, shown in FIG. 3 as $V_{org}$ exceeds the capabilities of the inverter 122. Specifically, the inverter 122 may have an input source voltage limitation, $V_{max}$ (labeled $V_{DC}$), which is shown in FIG. 3 as a magnitude of an arc extending between the direct axis (d-axis) and the quadrature axis (q-axis).

To limit the motor voltage command $V_R$ within the operating parameters of the inverter 122 during operational control of the motor 19, $V_{org}$ may be modified. As shown in FIG. 3, the motor voltage command $V_R$ may be limited to a magnitude represented by $V_{new}$ which is less than or equal to $V_{max}$. Therefore, $V_{new}$ is within the sourcing capabilities of the inverter 122. Directional angles of voltage vectors $V_{org}$ and $V_{new}$ are also shown in FIG. 3 as angles $\delta_{org}$ and $\delta_{new}$, respectively. The voltage vectors $V_{org}$ and $V_{new}$ are limited such that the directional angle of $V_{org}$ is preserved (i.e. $\delta_{org}=\delta_{new}$).

When the controller 16 computes voltage commands (transient or steady-state) beyond the voltage limit of the system, the voltage commands are limited to the maximum available battery voltage and the states (or element of the controller that has memory), such as that of an integrator, become incorrect, because they do not conform to the non-limited or pre-limited voltage commands computed originally. If the saturated condition lasts for a long period of time, the states of the controller may become highly incorrect. When the system returns to the linear operating range, the states can return to correct values after a certain amount of time, which is dependent on how long the saturation condition lasts as well as the post saturation conditions. This situation, referred to as controller windup, can produce poor overall control system performance and instability.

Accordingly, it is desirable to include an anti-windup (AW) apparatus/components to improve performance of the motor control system, and in turn the EPS system using the motor control system.

Further, particularly in case of the EPS system 40, as one of the main electric loads in a vehicle energy network, it is desired that the EPS system 40 be equipped with the capability of actively monitoring and controlling the supply current consumption. Such supply current consumption monitoring and control is driven by, among other reasons, the need to protect the vehicle electrical network especially under weak health conditions. For example, sharp transients in the supply current drawn by the EPS system 40 during abrupt voltage changes (that may be caused by internal errors in the vehicle electrical network) can result in further degradation of the electrical network health. When the supply voltage drops abruptly, the motor current control system within the EPS control loop exhibits voltage command saturation, which activates the anti-windup control apparatus that may be implemented for managing the dynamics of the overall control system.

Existing anti-windup apparatus/techniques attempt to maximize the motor torque or current production under saturation conditions. Alternatively stated, the goal of the existing anti-windup techniques, besides managing controller windup, is to minimize motor current tracking error when the controller 16 enters a voltage saturation condition. The goal of torque or current maximization directly contradicts the objective of supply current overshoot minimization, because the latter requires the motor torque and currents to be minimized.

The technical solutions described herein address such technical challenges by minimizing the supply current draw under voltage saturation conditions while providing anti-windup features. The technical solutions described herein cause the motor current control system to follow an electric-current trajectory that ends at the null motor current vector, or more generally towards a state of lower current vector magnitude in both (e.g., all) directions. This results in the minimization of supply current under voltage saturation, because the supply current reduces with reduction in motor currents.

Figure 4:
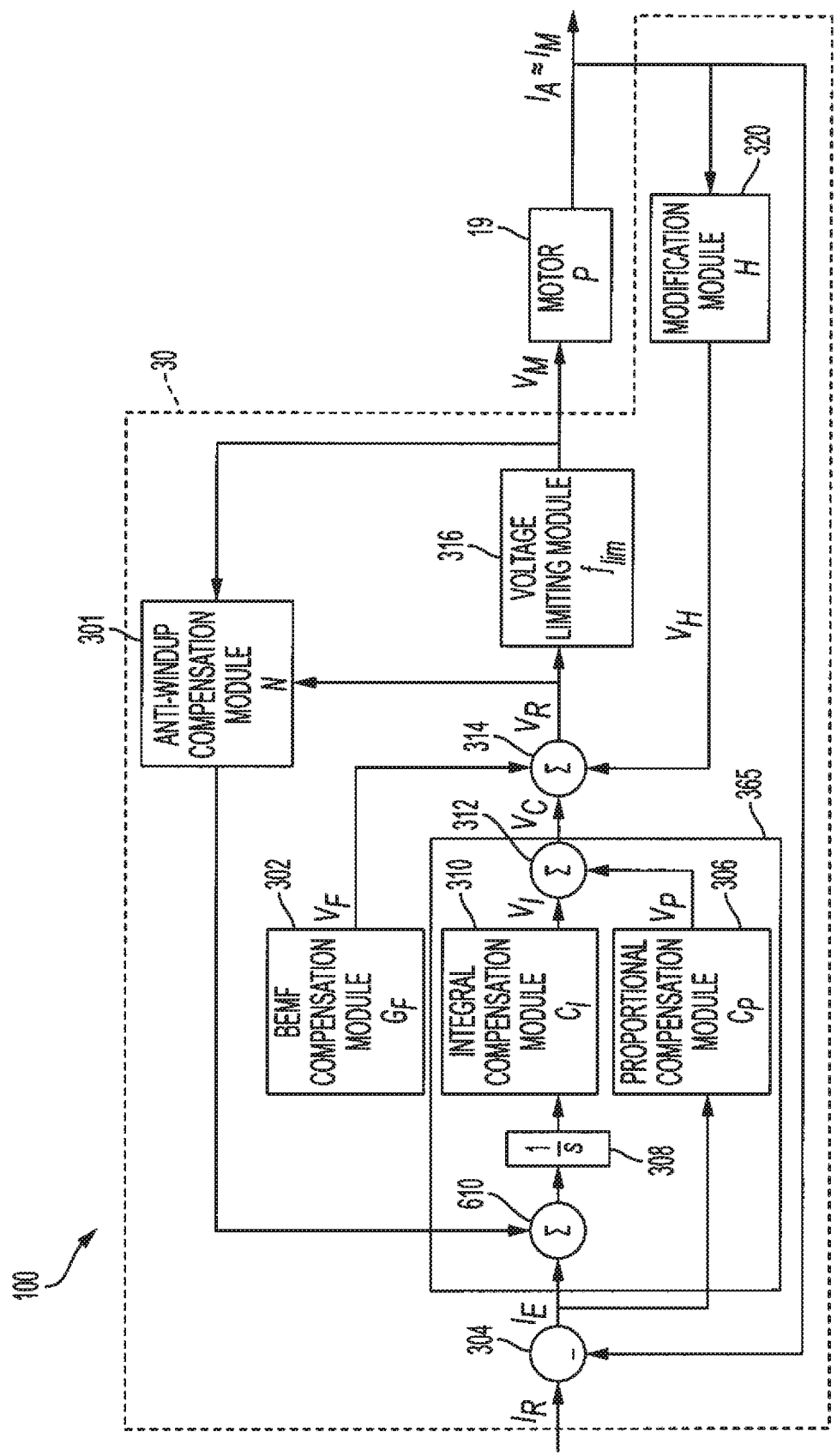
FIG. 4 is an example block diagram of a motor control system including anti-windup compensator module in accordance with illustrative embodiments.

FIG. 4 is a block diagram of an electric motor drive system according to one or more embodiments. The depicted electric motor drive system, which can also be referred to as a motor control system, includes a motor control module 30 implemented, for example, by the controller 16 and including a voltage limiting module 316, an anti-windup module 301, among other sub-modules, to control the operation of the motor 19. It should be noted that although the modules are depicted separately, in one or more examples, one or more of the depicted modules may be combined, or separated differently than the illustration.

As shown in FIG. 4, the motor control module 30 implemented by the controller 16 includes several other sub-modules such as—a back electromotive force (BEMF) voltage compensation module 302, a proportional-integral (PI) controller 365 (that includes compensation modules 306 and 310, and an integration module 308), a modification module 320, a subtraction module 304 and addition modules 312, 314, and 610.

The motor 19 depicted in FIG. 4 illustrates an example plant that is being controlled by the controller 16. That is, the motor 19 receives an actual motor voltage command $V_M$. The actual motor voltage command $V_M$ is based on a motor voltage command $V_R$. The actual motor voltage command $V_M$ may be limited by the limiting module 316, depending on whether the motor voltage command $V_R$ exceeds the capabilities of inverter 122 or other power source of the motor 19. The motor 19 generates torque and current (i.e., draws or outputs the current $I_A$ which is the actual motor current as described above by reference to FIGS. 1-3). The instantaneous power draw equation of the electric motor drive system can be expressed as follows $$V_{DC}I_S - R_{DC}I_S^2 = 3/2(V_d I_d + V_q I_q) \quad \text{(Equation 1)}$$

Here, $V_{DC}$ is the input voltage from the battery 10, $R_{DC}$ is the resistance of the electric motor drive system, and $I_S$ is the electric current that is input to the electric motor drive system, and where $V_d$, $V_q$ are the d/q motor voltages, $I_d$, $I_q$ are the d/q motor currents. In one or more embodiments the voltage values are measured in Volts and the electric current values are measured in Amperes.

The following equations defined in the d/q axis coordinate frame describe the plant transfer function (using line to neutral definitions) of the plant of the motor 20:

$$V_d = L_d \dot{I}_d + R I_d + \frac{N_p}{2}\omega_m L_q I_q \quad \text{(Equation 2)}$$

$$V_q = L_q \dot{I}_q + R I_q - \frac{N_p}{2}\omega_m L_d I_d + K_e \omega_m \quad \text{(Equation 3)}$$

$$T_e = \frac{3}{2}K_e I_q + \frac{3}{4}N_p(L_q - L_d)I_d I_q \quad \text{(Equation 4)}$$

Where $V_d$, $V_q$ are the d/q motor voltages (in Volts), $I_d$, $I_q$ are the d/q motor currents (in Amperes), $L_d$, $L_q$ are the d/q axis motor inductances (in Henries), R is the motor circuit (motor plus controller) resistance (in Ohms), $K_e$ is the motor BEMF constant (in Volts/rad/s), $\omega_m$ is the mechanical motor velocity in (in rad/s), and $T_e$ is the electromagnetic motor torque (in Nm).

In some embodiments, the limiter module 316 is a direction preserving voltage limiter that maintains the original phase angle while reducing the magnitude to the maximum available voltage. However, other voltage limiters may be used for the limiter module 316 that modify both the magnitude and the angle of the voltage command. The limiter module 316 outputs a limited voltage command represented by $V_M$.

A current command generator (not shown in FIG. 4) converts a torque command into current commands considering multiple objectives and constraints such as minimum loss and supply voltage limit. In one or more examples, the current command ($I_R$) is generated based on a torque equation. The electromagnetic torque as specified in Equation (4) is nonlinear and represents sum of the torque developed by leveraging the magnetic field from the permanent magnets, and the reluctance torque generated by rotor saliency (difference between $L_d$ and $L_q$) and proper choice of $I_q$ and $I_d$.

Further, the flux linkages of the plant may be expressed as:

$$\lambda_d = L_d I_d - \lambda_m = L_d I_d - 2/N_P K_e \quad \text{(Equation 5)}$$

$$\lambda_q = L_q I_q \quad \text{(Equation 6)}$$

Note that the d-axis flux linkage comprises the flux due to the permanent magnets $\lambda_m$, and an opposing flux component due to the d-axis motor current. In terms of the flux linkages, the voltage equations may be restated as:

$$V_d = \dot{\lambda}_d + \omega_e \lambda_q + I_d R \quad \text{(Equation 7)}$$

$$V_q = \dot{\lambda}_q - \omega_e \lambda_d + I_q R \quad \text{(Equation 8)}$$

In, the steady state, the voltage equations may become, $$V_d = \omega_e \lambda_q + I_d R \quad \text{(Equation 9)}$$

$$V_q = -\omega_e \lambda_d + I_q R \quad \text{(Equation 10)}$$

The motor 19 together with the controller 16 makes up a closed-loop system that has a certain frequency response characteristic. As can be appreciated, the frequency response of the closed-loop system is governed by a set of model equations that defines a transfer function that transforms the input current command $I_R$ to the output current $I_M$. In other words, the controller 16 regulates the output current $I_M$ by sending the actual motor voltage command $V_M$ generated based on the input current command $I_R$. $I_M$ is the current measured and fed back to the controller 16.

The modification module 320 shown in FIG. 4 takes as input from the motor 19 the measured feedback current $I_M$. Based on the measured feedback current $I_M$, the modification module 320 decouples the d-axis component $I_d$ of the output current $I_A$ from the variations of the q-axis current component $I_q$.

The compensation modules 306 and 310 depicted in FIG. 4 make up a matrix-valued (or, multi-dimensional) PI controller 365 that compensates for a difference $I_E$ between a commanded current $I_R$ and the measured current $I_M$ to control the motor 19. The compensation module 306 produces a proportional voltage command $V_P$ from a difference current $I_E$ (determined by the subtraction module 304). The compensation module 306 along with the integration module 308 produces an integral voltage command $V_I$. The addition module 312 combines the voltage commands $V_P$ and $V_I$ to produce a voltage command $V_C$. The proportional voltage command $V_P$ and the integral voltage command $V_I$ are determined in such a way that the combined voltage command $V_C$, when applied to the motor 19, causes the overall current to current transfer function to be of a specific, desired order. It is to be noted that each of $I_R$, $I_M$, $I_E$, $V_P$, $V_I$, and $V_C$ has a d-axis component and a q-axis component. Also, $I_R$, $I_M$, $I_E$, $V_P$, $V_I$, and $V_C$ represent vectors and not scalar values, each consisting of a d-axis and a q-axis signal (quantity).

The compensation module 306 is a proportional controller and the compensation module 310 is an integral controller, together being part of the PI controller 365. The proportional compensation module $C_P$ aids in configuring the frequency response of the closed-loop system when the first order type response is desired, in addition to providing beneficial tradeoffs between the motor input disturbance transfer function behavior and the current measurement noise transfer function behavior. When a higher order transfer function (e.g., a third order) is desired, a different configuration than the PI controller 365 is utilized. For example, only an integrator module 308 and compensation module ($C_I$) 308 may be used, without the proportional compensator ($C_P$) 306. In such cases the output of the PI controller 365 is just the $V_I$, which may be further compensated by the BEMF compensator 302 to generate PI controller output $V_R$.

As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 4, or any other figures herein, may be combined and/or further partitioned. Software can be written in any form of programming language, including compiled or interpreted languages, and it can be deployed in any form, including as a stand-alone program or as a module, component, subroutine, or other unit suitable for use in a computing environment.

In some embodiments, the controller 16 is a feedback controller having a closed-loop control logic. That is, the output current of the motor 19 is fed back to the controller 16 and the controller 16 uses the feedback to regulate the output of the motor 19. As the output current $I_M$ is fed back to the controller 16, a controller windup may be generated, where motor voltage command $V_R$ may exceed actual motor voltage command $V_M$. This can lead to instability in a motor control system because of a windup condition that is generated in this circumstance, which is a technical challenge addressed by the technical solutions described herein.

Control systems are typically designed to satisfy a set of linear performance metrics, but the control systems typically utilize actuators, such as inverters, that have operating limits. Controller windup may occur when the controller 16 produces control signals that are beyond actuator capabilities, causing saturation. Under a saturation condition, the control signals that are applied to the plant are limited and every component of the controller that has memory (or states) is updated incorrectly. This condition can result in controllers with memory accumulating large errors, which can return to correct values only after the system has come out of saturation and remained in this condition for a period of time. Thus, when controller windup occurs, the system can potentially remain in the saturated condition for a period of time longer than desirable, and ultimately degrade overall performance. The technical solutions described herein address such a technical challenge by facilitating preventing controller windup occurrences.

Further, particularly in PMSM drive systems in EPS systems, the DC bus voltage is supplied by the vehicle battery 10. Typically, to make the most use of the PMSM's capability, the drive system is operating in the maximum torque per voltage (MTPV) mode in which the PMSM can generate the maximum torque under the given battery voltage. During operation near the voltage limit, the actuator is more likely to saturate, especially under the presence of parameter errors or when the motor control system is subjected to external disturbances or failures. The technical solutions described herein address such a technical challenge by facilitating preventing controller windup occurrences using an anti-windup module 301, as illustrated in FIG. 4.

As described in more detail below, the anti-windup (AW) module 301 selectively detects a voltage saturation condition and supplies an accurate representation of the actual motor voltage command $V_M$ to an input of the motor control system, thereby improving system performance. A voltage saturation condition may occur when a vector summation of an output of the current regulators of both the d and q axes current loops becomes greater in magnitude than the available DC link voltage $V_{DC}$. A voltage saturation condition may be expressed according to the following equation:

$$\sqrt{V_{dR}^2 + V_{qR}^2} \geq V_{DC} \quad \text{(Equation 11)}$$

With continued reference to FIG. 4, the AW module 301 implements an anti-windup in addition to the decoupling of the current control to ensure that the control states with memory characteristics are bounded when the calculated commands exceed the operational range of the inverter 122. The typical anti-windup algorithms feed the difference of the limited and original control signals via a linear decoupled compensator (typically static, i.e., containing no dynamical terms) to the input of the controller 16. Alternatively, typical AW algorithms limit the outputs of compensation modules 306 and 310 based on the difference between feedforward and feedback signals. The improved AW module 301 described herein addresses the technical challenge described herein in accordance with illustrative embodiments by minimizing the supply current draw under voltage saturation conditions while providing anti-windup features.

It can be seen from the above equations that both, motor currents $I_{dq}$ and (alternatively) the motor voltages $V_{dq}$ contribute to the power consumption or supply current draw.

Accordingly, the one or more embodiments facilitate controlling overall supply current by altering the trajectory of the voltage vector in a way such that the motor currents are reduced.

Figure 5:
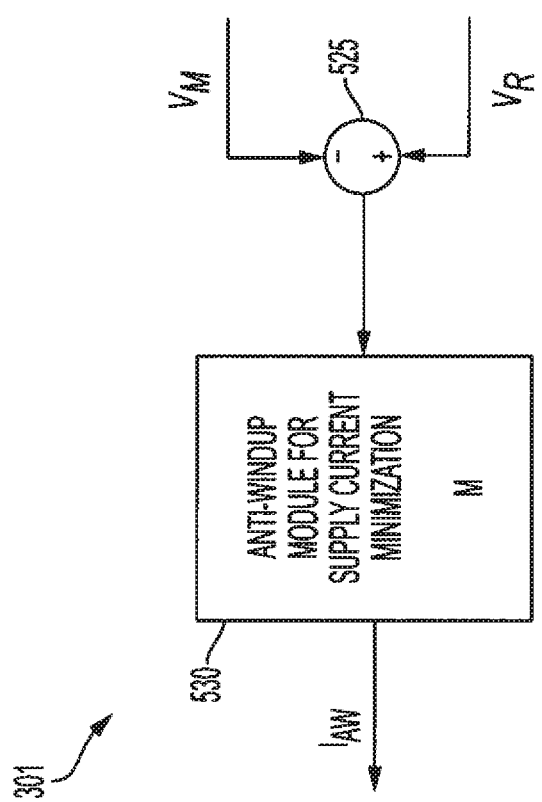
FIG. 5 is an example block diagram of an anti-windup module in accordance with illustrative embodiments.

FIG. 5 depicts details of the anti-windup module 301 according to one or more embodiments. The anti-windup module 301 includes an anti-windup module or "M" module for supply current minimization (M) indicated at 530. The limited voltage commands $V_M$ are subtracted from the commanded voltages $V_R$ at the subtraction module 525 as expressed below.

$$V_C = V_R - V_M \qquad \text{Equation (12)}$$

The M module 530 is configured with compensation gains that minimize supply current draw. For minimizing the current draw, the matrix implemented via the M module 530 causes the motor current trajectory to move towards the null motor current vector, or more generally towards a state of lower current vector magnitude in all directions, when the commanded motor voltage ($V_R$) is unequal to the final (limited) voltage ($V_M$).

The M module 530 receives the voltage difference $V_C$ and computes an anti-windup feedback current $I_{AW}$. The anti-windup feedback current is added with the current command $I_E$, which is being input to the integral controller (308, 310) within the PI controller 365. The M module 530 computes the anti-windup feedback current based on the voltage difference $V_C$ using one or more configurable parameters. In one or more examples, the parameters are configured as values in a matrix that is multiplied with the voltage difference $V_C$.

Figure 6:
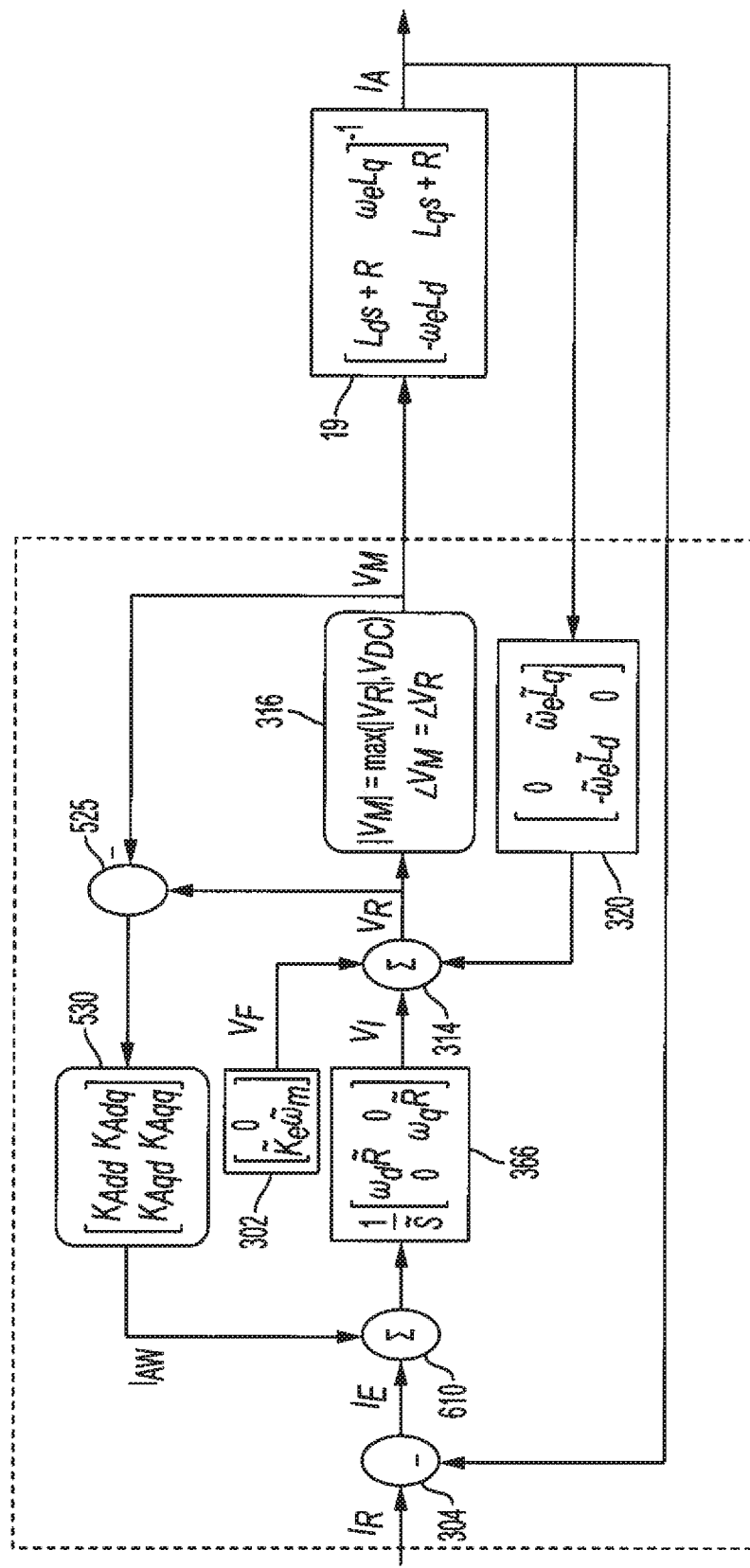
FIG. 6 is an example block diagram of an motor control system having an improved anti-windup compensator module that minimizes supply current under voltage saturation conditions in accordance with illustrative embodiments.

To further explain the operation, a simplified embodiment of the AW module 301 is described next. FIG. 6 depicts a block diagram of an electric motor drive according to one or more embodiments. It should be noted that FIG. 6 depicts selective components from FIG. 4. In the depicted embodiment, the voltage limiter 316 is a direction preserving voltage limiter. The anti-windup action is performed through feeding back the scaled error (difference) through a static gain matrix (530) to the input of the integral compensators or integral controller (366). The scaled error is a vector difference between pre-limit voltage command ($V_R$) and the post-limit voltage command ($V_M$).

For simplicity, a 1 degree-of-freedom current controller is depicted, however it is understood that the controller can have 2, 3, ..., n degrees of freedom in other embodiments. The M module 530, in this case, includes four gain parameters for introducing feedback cross-coupling of the voltage difference $V_c$ between the pre-limit and post-limit ($V_R$ and $V_M$) to the current error ($I_E$). The current vector with the proposed anti-windup scheme is expressed as follows:

$$I_T = (C_P + H + K_I P^{-1})^{-1} K_I I_R + (C_P + H + K_I P^{-1})^{-1} (J + K_I C_A)(V_R - V_M) \qquad \text{Equation (13)}$$

In the above equation (12), $I_T$ represents the true motor current output.

By scaling the vector difference between the pre-limit and post-limit voltage commands, the AW module 301 limits the input and output of the integral controller 366 when voltage limiter 316 is activated (or when the motor control system reaches the voltage limit). It should be noted that the voltage limiter 316 is activated only when the voltage command from the adder 314 exceeds the configured threshold for limiting the voltage being applied to the motor 19. When the motor control system 100 is settled to steady-state, the modified input of the integrator 308 is zero while the output remains constant. Because the integral controller 366 is always in operation, the motor control system 100 transitions from unsaturation to saturation in a seamless and smooth manner.

Assuming accurate decoupling via the state-feedback compensator (320) and exact back-EMF compensation (302) using the disturbance feedforward term, the motor currents may be expressed in s-domain as follows.

$$\begin{bmatrix} I_{Td} \\ I_{Tq} \end{bmatrix} = \begin{bmatrix} \dfrac{K_{Idd}}{\tilde{s}(L_d s + R) + K_{Idd}} & 0 \\ 0 & \dfrac{K_{Iqq}}{\tilde{s}(L_q s + R) + K_{Iqq}} \end{bmatrix} \begin{bmatrix} I_{Rd} \\ I_{Rq} \end{bmatrix} + \begin{bmatrix} \dfrac{\tilde{s} + K_{Idd} K_{Add}}{\tilde{s}(L_d s + R) + K_{Idd}} & \dfrac{K_{Idd} K_{Adq}}{\tilde{s}(L_d s + R) + K_{Idd}} \\ \dfrac{K_{Iqq} K_{Aqd}}{\tilde{s}(L_q s + R) + K_{Iqq}} & \dfrac{\tilde{s} + K_{Iqq} K_{Aqq}}{\tilde{s}(L_q s + R) + K_{Iqq}} \end{bmatrix} \begin{bmatrix} V_{Rd} - V_{Md} \\ V_{Rq} - V_{Mq} \end{bmatrix} \qquad \text{Equation (14)}$$

In the steady-state, the final modified currents can be written as $$\begin{bmatrix} I_{Td} \\ I_{Tq} \end{bmatrix} = \begin{bmatrix} 1 & 0 \\ 0 & 1 \end{bmatrix} \begin{bmatrix} I_{Rd} \\ I_{Rq} \end{bmatrix} + \begin{bmatrix} K_{Add} & K_{Adq} \\ K_{Aqd} & K_{Aqq} \end{bmatrix} \begin{bmatrix} V_{Rd} - V_{Md} \\ V_{Rq} - V_{Mq} \end{bmatrix} \qquad \text{Equation (15)}$$

Accordingly, as per the equations, the steady-state values of the motor currents can be changed when the voltage error is non-zero (i.e., under voltage saturated operation) by selecting the anti-windup compensator gains $K_{Add}$, $K_{Adq}$, $K_{Aqd}$, and $K_{Aqq}$. For instance, positive values of $K_{Adq}$ and $K_{Aqq}$ result in a negative value of $I_{Aq}$ under all conditions, which therefore results in lower supply current draw. The other gains may be selected and tuned similarly to cause both the motor currents $I_{Tq}$ and $I_{Td}$ to tend towards lower values and thus in-turn reduce supply current during voltage saturated operation. Accordingly, the anti-windup compensator gains $K_{Add}$, $K_{Adq}$, $K_{Aqd}$, and $K_{Aqq}$ of the M module 530 are configured to reduce supply current during voltage saturated operation. Further, the linear gains can be replaced by any arbitrary mathematical functions (which may be linear or non-linear in nature) that assist simultaneous reduction of both motor currents under voltage saturated operation.

The technical solutions described herein facilitate minimizing supply current draw under voltage saturated current control operation of synchronous motor drives. The technical solutions described herein address the technical challenges regarding windup of a motor control system. The technical solutions described herein improve the existing anti-windup techniques because the existing solutions are developed using steady state models and inherently assume that voltage saturation (transient or steady state) does not occur. In case voltage saturation occurs, existing techniques cannot control the supply current behavior since the anti-windup compensators dominate the motor current tracking behavior which ultimately determines the supply current variation. Accordingly, the technical solutions described herein provide an improved anti-windup by minimizing supply current draw under voltage saturated current control operation of synchronous motor drives.

With continued reference to FIG. 6, an improved anti-windup operation can be performed by the controller 16 in accordance with one or more embodiments. As can be appreciated in light of the disclosure, the order of operation within the method is not limited to the sequential execution illustrated in FIG. 6, but may be performed in one or more varying orders as applicable and in accordance with the present disclosure.

The method includes computing post-limited voltage command ($V_M$) from the pre-limited ($V_R$) using the limiting module 316. The limiting module 316 determines if the pre-limited voltage command exceeds the predetermined threshold for a maximum voltage command that is to be applied to the motor 19. If the threshold is exceeded, the anti-windup module 301 is activated and the pre-limit and the post-limit voltage commands ($V_R$ and $V_M$) are input to the anti-windup module 301.

The resulting value from the anti-windup module 301 is fed back as a feedback current $I_{AW}$ to modify the current command $I_E$ that is being input to the PI controller 365 that generates the voltage command that is input to the voltage limiting module 316. This process that includes at least the above operations is continuous.

The resulting voltage command from the voltage limiting module 316 is applied to the motor 19. The voltage command is generated based on the modified current command. It should be noted that the output current from the motor 19 is also used in at least two separate feedback loops one to generate the pre-limit voltage command ($V_R$) and one to generate the input current command ($I_E$).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A motor control system for preventing controller windup and managing supply current under voltage saturation conditions, the motor control system comprising:
a voltage limiting module configured to receive a pre-limit voltage command and generate a post-limit voltage command when the motor control system reaches a selected voltage limit corresponding to a configured threshold for limiting voltage applied to a motor controlled by the motor control system; and
an anti-windup module configured to determine a voltage difference by subtracting the post-limit voltage command from the pre-limit voltage command, and to compute an anti-windup feedback current using the voltage difference and compensation gains selected to minimize supply current;
wherein the anti-windup feedback current is provided as feedback to an input current command to the motor control system to introduce feedback cross-coupling of the voltage difference to the current error, and the anti-windup feedback current and an input current command are added and provided as an input to an integral controller to generate a voltage command.

2. The motor control system of claim 1, wherein the compensation gains comprise a gain matrix of values selected to move a motor current trajectory of the motor toward a null motor current vector, and the anti-windup module multiplies the gain matrix values by the voltage difference.

3. The motor control system of claim 1, wherein the anti-windup module computes the anti-windup feedback current using a calculation comprising scaling the voltage difference using a gain matrix defined as $$K_{AW} = \begin{bmatrix} K_{Add} & K_{Adq} \\ K_{Aqd} & K_{Aqq} \end{bmatrix},$$

wherein $K_{Add}$, $K_{Adq}$, $K_{Aqd}$, and $K_{Aqq}$ are anti-windup parameters.

4. The motor control system of claim 1, wherein the input current command is further modified by adding a second feedback current based on a measured current of the electric motor.

5. The motor control system of claim 1, wherein the pre-limit voltage command is computed based on a back electromotive force (BEMF) compensation and a feedback based on a measured current of the electric motor.

6. A method for preventing controller windup in an electric motor and managing supply current under voltage saturation conditions, the method comprising:
receiving, by voltage limiting module in a motor control system, a pre-limit voltage command and generating a post-limit voltage command when the motor control system reaches a selected voltage limit corresponding to a configured threshold for limiting voltage applied to a motor controlled by the motor control system;
determining, by an anti-windup module in the motor control system, a voltage difference by subtracting the post-limit voltage command from the pre-limit voltage command, and computing an anti-windup feedback current using the voltage difference and compensation gains selected to minimize supply current;
providing the anti-windup feedback current as feedback to an input current command to the motor control system to introduce feedback cross-coupling of the voltage difference to the current error; and
adding the anti-windup feedback current and the input current command and providing a resulting summed current as an input to an integral controller to generate motor voltage commands.

7. The method of claim 6, wherein the compensation gains comprise a gain matrix of values selected to move a motor current trajectory of the motor toward a null motor current vector, and further comprising multiplying, by the anti-windup module, the gain matrix values by the voltage difference.

8. The method of claim 6, wherein computing the anti-windup feedback current comprises using a calculation comprising scaling the voltage difference using a gain matrix defined as $$K_{AW} = \begin{bmatrix} K_{Add} & K_{Adq} \\ K_{Aqd} & K_{Aqq} \end{bmatrix},$$

wherein $K_{Add}$, $K_{Adq}$, $K_{Aqd}$, and $K_{Aqq}$ are anti-windup parameters.

9. The method of claim 6, further comprising modifying the input current command by adding a second feedback current based on a measured current of the electric motor.

10. The method of claim 6, wherein the pre-limit voltage command is computed based on a back electromotive force (BEMF) compensation and a feedback based on a measured current of the electric motor.

11. A steering system comprising:
an electric motor that generates an amount of torque corresponding to a post-limit voltage command;
a controller that receives an input current command and generates a voltage command for the motor, the controller comprising
a voltage limiting module configured to receive a voltage command corresponding to a pre-limit voltage command and generate post-limit voltage command when the motor control system reaches a selected voltage limit corresponding to a configured threshold for limiting voltage applied to the motor; and
an anti-windup module configured to determine a voltage difference by subtracting the post-limit voltage command from the pre-limit voltage command, and to compute an anti-windup feedback current using the voltage difference and compensation gains selected to minimize supply current;
wherein the anti-windup feedback current is provided as feedback to an input current command to the motor control system to introduce feedback cross-coupling of the voltage difference to the current error, and the anti-windup feedback current, an input current command, and a second feedback current based on a measured current of the motor are added and provided as an input to an integral controller to generate the voltage commands.

12. The steering system of claim 11, wherein the compensation gains comprise a gain matrix of values selected to move a motor current trajectory of the motor toward a null motor current vector, and the anti-windup module multiplies the gain matrix values by the voltage difference.

13. The steering system of claim 11, wherein the anti-windup module computes the anti-windup feedback current using a calculation comprising scaling the voltage difference using a gain matrix defined as $$K_{AW} = \begin{bmatrix} K_{Add} & K_{Adq} \\ K_{Aqd} & K_{Aqq} \end{bmatrix},$$

wherein $K_{ddd}$, $K_{Adq}$, $K_{Aqd}$, and $K_{Aqq}$ are anti-windup parameters.

14. The steering system of claim 11, wherein the pre-limit voltage command is computed based on a back electromotive force (BEMF) compensation and a feedback based on a measured current of the electric motor.

15. A motor control system for preventing controller windup and managing supply current under voltage saturation conditions, the motor control system comprising:
a voltage limiting module configured to receive a pre-limit voltage command and generate a post-limit voltage command when the motor control system reaches a selected voltage limit corresponding to a configured threshold for limiting voltage applied to a motor controlled by the motor control system; and
an anti-windup module configured to determine a voltage difference by subtracting the post-limit voltage command from the pre-limit voltage command, and to compute an anti-windup feedback current using the voltage difference and compensation gains selected to minimize supply current, the anti-windup feedback current and an input current command being added and provided as an input to an integral controller to generate a voltage command.

* * * * *